May 29, 1956    S. BRIGHT, JR    2,747,472
METHOD OF MAKING PLASTIC FOLDING CONTAINERS
Filed July 12, 1950    2 Sheets-Sheet 1

INVENTOR:
Stanley Bright, Jr.,
BY Paul & Paul
ATTORNEYS.

May 29, 1956 S. BRIGHT, JR 2,747,472
METHOD OF MAKING PLASTIC FOLDING CONTAINERS
Filed July 12, 1950 2 Sheets-Sheet 2

INVENTOR:
Stanley Bright, Jr.,
BY Paul & Paul
ATTORNEYS.

United States Patent Office 2,747,472
Patented May 29, 1956

2,747,472
METHOD OF MAKING PLASTIC FOLDING CONTAINERS

Stanley Bright, Jr., Haverford, Pa., assignor to Troth Bright Page, Inc., Paoli, Pa., a corporation of Pennsylvania Application July 12, 1950, Serial No. 173,353

3 Claims. (Cl. 93—36)

This invention relates to a method of making plastic folding containers, and further relates to a method of mass producing seamless, plastic, folding container blanks. More particularly, this invention relates to a method of making a plastic folding container blank which comprises cutting a flattened, extruded, plastic tube into segments, each of which ultimately constitutes a container blank, and at the same time cutting flaps and locking tabs on each side of the tube segments or container blanks, opening the flattened blanks and passing them through a set of rollers so as to flatten them along fold lines between the original fold lines. More particularly, this invention relates to a method of making a plastic folding container blank which comprises extruding a plastic tube of enclosed cross section, folding the tube substantially flat, cutting the tube into segments, each of which ultimately constitutes a container blank, and at the same time cutting flaps and locking tabs on each side of the tube segments or container blanks, opening the flattened blanks and passing them through a set of rollers so as to flatten them along fold lines between the original fold lines.

Plastic folding containers, which are relatively new in the art, are usually assembled in final form by heat sealing or by means of adhesives applied along a flap element. The fabrication of containers by this method involves not only an extra operation but also results in a visible line along the joining element.

It is accordingly an object of this invention to provide a rapid and economical method of making a plastic folding container having no adhesive seams. It is another object of my invention to make a strong, durable plastic folding container blank in the form of a flat double sheet for convenience and economy in shipping. Other objects and means for carrying them into effect will appear hereinafter and in the drawings, in which.

In practicing the method which constitutes my invention a suitable transparent plastic material is first extruded through a set of dies or other extruding means. Such plastic material may be any of the well known transparent plastics which become partially fluid under pressure and revert to an inflexible physical state when the pressure is released. The extrusion of several varities of plastics may be accomplished at ordinary temperatures by application of pressure against the bulk plastic material to force it through a die. In some cases, however, it is found desirable to enhance the plasticity of the plastic and for this purpose one of the various known plasticizers may be compounded into the particular plastic to be extruded. It is also possible to include minor amounts of solvent in the plastic to facilitate extrusion. In practicing the extrusion step of my invention, the plastic material may be forced through the annular space between a pair of extrusion dies or in other apparatus commonly employed for the extrusion of plastic material of this type. The dies are preferably circular in shape and produce a continuous hollow plastic tube. Plastic structures having closed cross sections of any kind are referred to herein as tubes. In carrying out the extrusion step of my method, the extrusion dies may be heated to attain preferred extrusion of some plastic materials, and to drive off any solvent that may have been included in the original plastic stock, but in many instances the extrusion may be accomplished without heating.

Figure 6:
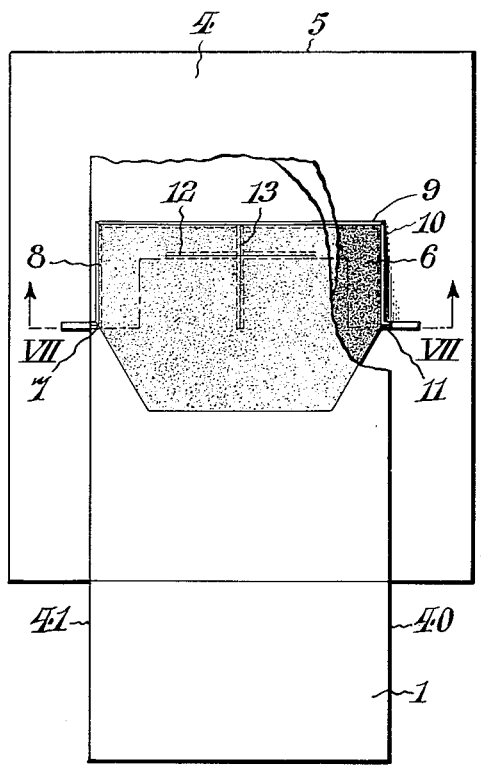
Fig. 6 is bottom plan view of the cutting die for cutting the extruded plastic tube into segments or container blanks with an extruded plastic tube interposed and positioned thereunder.

After the plastic tube 1 has been extruded, it is flattened between spaced rollers or by other means well known to the art to form a pair of opposed plastic surfaces as indicated in Fig. 6, assuming a relatively rigid, substantially flattened shape, and having folding lines 40 and 41. The flattened tube 1 is then placed upon a flat, horizontal bed or table (not shown). Positioned above this bed or table is a cutting die 4 as shown in Figs. 6 and 8.

Figure 3:
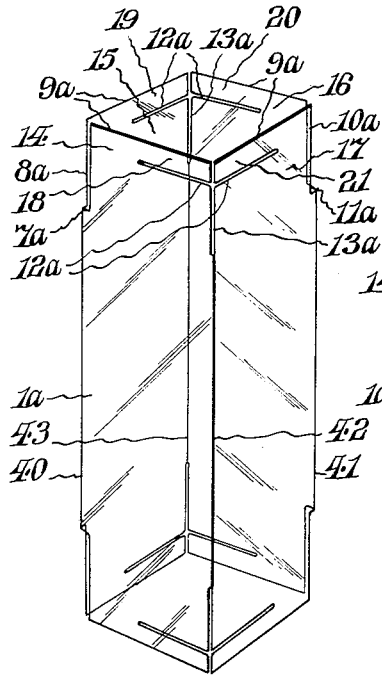
Fig. 3 is a perspective view of a finished seamless plastic folding container blank with its flaps opened.
Figure 8:
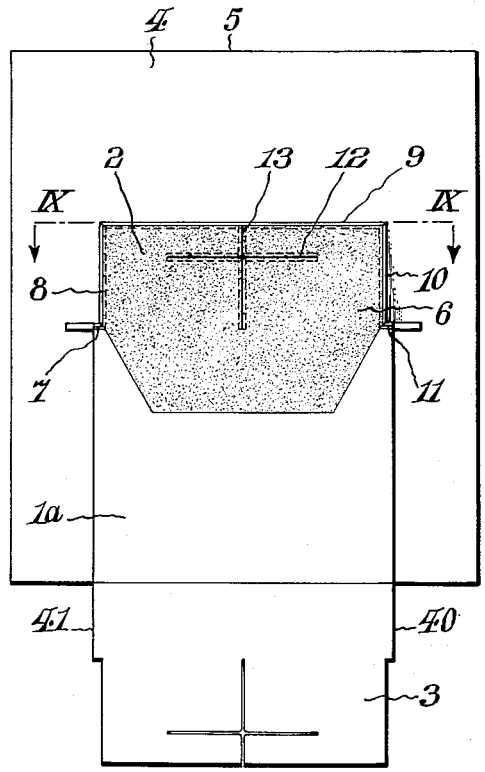
Fig. 8 is a bottom plan view of the cutting die for cutting the extruded plastic tube into segments or container blanks showing such a container blank interposed and positioned thereunder as it appears immediately after the cutting operation.
Figure 7:
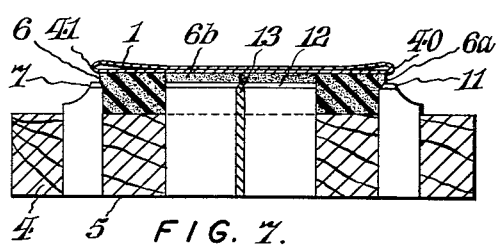
Fig. 7 is a sectional view taken on line VII—VII of Fig. 6.
Figure 9:
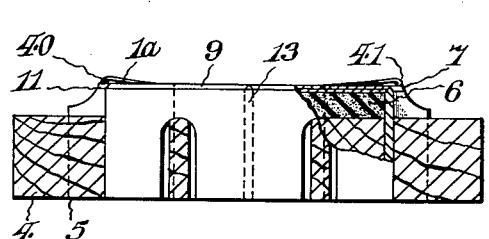
Fig. 9 is a sectional view taken on line IX—IX of Fig. 8.
Figure 10:
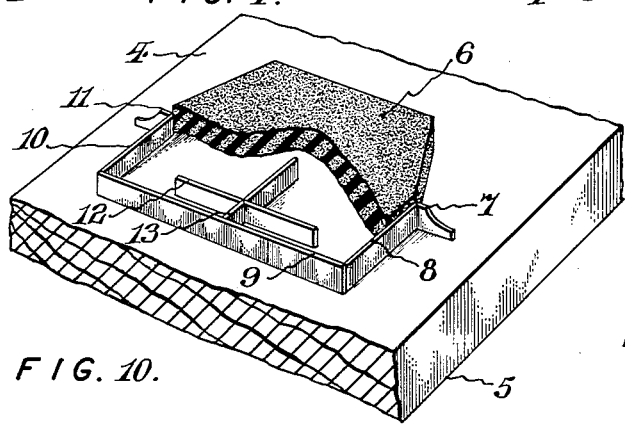
Fig. 10 is a perspective view of the cutting die showing in full all the cutting edges thereof.

Cutting die 4 consists of a head 5, preferably made of wood, having mounted thereon a plurality of cutting blades 7, 8, 9, 10, 11, 12 and 13, preferably made of steel or other metal, and a soft, resilient substance 6, as shown in Figs. 6, 7, 8, 9 and 10. The soft, resilient substance 6 is designed to extend or protrude slightly below the cutting blades as shown at 6a and 6b in Fig. 7. In operation, a force is exerted against cutting die 4 by any means well known in the art causing it to descend upon and press against tube 1 resting upon the aforementioned horizontal table or bed. The force exerted upon cutting die 4 causes the cutting blades 7, 8, 9, 10, 11, 12 and 13 to penetrate through and completely sever the plastic tube 1 forming edges 7a, 8a, 9a, 10a and 11a and slots 12a and 13a, more clearly shown in Fig. 3, which edges and slots in turn define flaps 14, 15, 16 and 17 and locking tabs 18, 19, 20 and 21. Simultaneous with the penetration and cutting of the tube 1 by the cutting blades, the soft, resilient substance 6 is pressed against the tube 1 and caused to be contracted above the edges of the cutting blades as is illustrated in Fig. 9. After the cutting operation, the head 4 is raised releasing the force which holds the substance 6 in a compressed state and permitting it, under its own resilience, to expand to its normal position beyond the edges of the cutting blades. This expansion operates to free or remove the plastic from the cutting edges, since the plastic is otherwise inclined to stick to the cutting blades after the cutting operation.

Fig. 8 shows a blank 1a positioned under head 4 immediately after the cutting operation has been performed on end 2 of the blank 1a. A similar cutting operation will be performed on end 3 so as to complete the formation of blank 1a. It is to be noted that the cutting operation of ends 2 and 3 may be performed simultaneously by means of two cutting dies properly spaced and having their corresponding cutting blades diametrically related to each other. It is to be further noted that the cutting operation may be performed on a continuous strip of extruded and flattened plastic material moving over a flat, horizontal bed or table which may be extended to make it possible to employ a plurality of cutting dies in nested relationship. For mass production this feature is of great importance since it provides a continuous process for making plastic folding container blanks.

Figure 1:
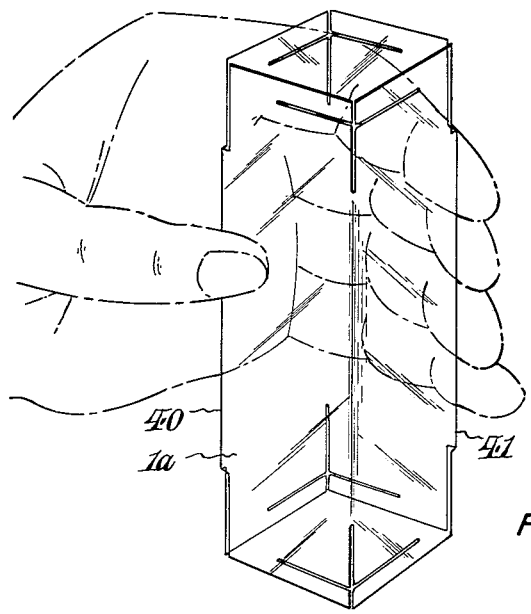
Fig. 1 is a perspective view of a seamless plastic folding container blank produced by my method that has been cut and opened and is ready to be flattened by means of a pair of rollers.
Figure 2:
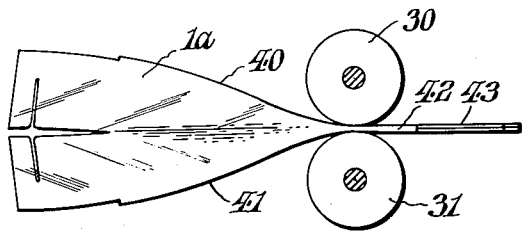
Fig. 2 is a view showing the seamless plastic folding container blank of Fig. 1 being flattened by means of a pair of rollers.
Figure 4:
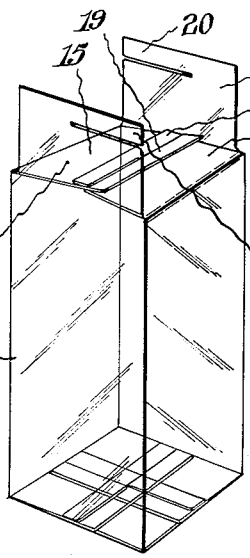
Fig. 4 is a perspective view of a finished seamless plastic folding container blank with its flaps partially closed.
Figure 5:
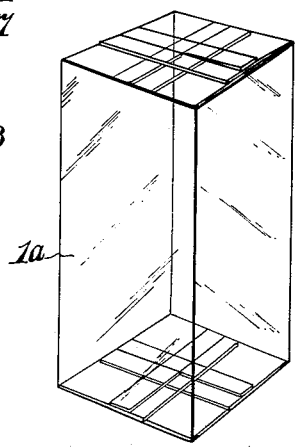
Fig. 5 is a perspective view of a finished seamless plastic folding container blank with all its flaps closed.

After completion of the cutting operation, the blank is removed from the horizontal bed or table and is opened as shown in Fig. 1. It is then passed between rolls 30 and 31, in a manner to flatten it and to force the surfaces which include edges 40 and 41 close together forming edges 42 and 43. The blank is then opened taking the form appearing in Fig. 3 and is now ready to be closed in the manner disclosed in Figs. 4 and 5, the flaps and locking tabs being foldable so as to provide appropriate end closures for the container.

It is to be understood that the apparatus and method of the invention, herewith shown and described, is to be taken as a preferred example of the same, and that various changes in shape, size and arrangement of the parts, and of the container blanks produced, may be resorted to, without departing from the spirit of the invention, or the scope of the subjoined claims.

Having thus described my invention, I claim:

1. A method of making a folding container blank comprising extruding a relatively stiff elastic tube from bulk plastic stock, flattening said tube along fold lines to form oppositely positioned substantially flat walls, cutting the flattened tube into a plurality of blanks, cutting unidirectionally through both walls of the end portions of each blank to form interlockable closure elements, separating the walls of each blank to form a tubular section, and flattening the tubular section along fold lines between the original fold lines to position the closure elements so that they may be folded upon each other and interlocked to form end closures for said tubular section.

2. A method of making a folding container blank from a tube of relatively stiff elastic material comprising flattening said tube along fold lines to form oppositely positioned substantially flat walls, cutting unidirectionally through both walls of the end portions of said tube while in the flattened condition by forcing it against a cutting die of predetermined configuration, separating the walls of the flattened tube to form a tubular section and reflattening it along fold lines between the original fold lines to place the cut end portions in position so that they may be folded upon each other and interlocked to form end closures for said tube.

3. A method of making a folding container blank comprising flattening a tube of relatively stiff elastic material, successively cutting the tube into blanks and cutting unidirectionally through both walls of the end portions of each blank to form overlapping, interlocking end closure elements, opening the flattened blanks and reflattening them to dispose the interlocking end closure elements at each end of the blanks opposite to each other so that they may be overlapped and interlocked to form end closures for the blanks.

References Cited in the file of this patent

UNITED STATES PATENTS

| | | |
|---|---|---|
| 259,238 | Stocking | June 6, 1882 |
| 996,785 | Motz | July 4, 1911 |
| 2,106,431 | Jones | Jan. 25, 1938 |
| 2,183,691 | Owens | Dec. 19, 1939 |
| 2,241,817 | Howard | May 13, 1941 |
| 2,367,688 | Powell | Jan. 23, 1945 |
| 2,452,080 | Stephenson | Oct. 26, 1948 |